US010104007B1

(12) United States Patent
Van Rensburg

(10) Patent No.: US 10,104,007 B1
(45) Date of Patent: Oct. 16, 2018

(54) STORED VIEWS OF WEB SERVICE APPLICATION PROGRAMMING INTERFACES (APIS)

(71) Applicant: Amazon Technologies, Inc., Seattle, WA (US)

(72) Inventor: Marcel Jon Van Rensburg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 14/958,767

(22) Filed: Dec. 3, 2015

(51) Int. Cl.
*G06F 15/173* (2006.01)
*H04L 12/911* (2013.01)
*H04L 29/08* (2006.01)

(52) U.S. Cl.
CPC .......... *H04L 47/70* (2013.01); *H04L 67/1097* (2013.01)

(58) Field of Classification Search
CPC ............................ H04L 47/70; H04L 67/1097
USPC ................................ 709/223, 224, 203, 217
See application file for complete search history.

(56) References Cited

U.S. PATENT DOCUMENTS 8,521,754 B2 * 8/2013 Trevor ................ G06F 17/3089 707/756
2011/0179147 A1 * 7/2011 Ravichandran ........ G06Q 10/06 709/220
2014/0211665 A1 * 7/2014 Voccio ................ H04L 12/1403 370/259
2014/0215443 A1 * 7/2014 Voccio ................ G06F 11/3612 717/128
2016/0127254 A1 * 5/2016 Kumar .................... H04L 47/70 709/226
2016/0173475 A1 * 6/2016 Srinivasan ....... G06Q 10/06315 726/6

* cited by examiner

*Primary Examiner* — Frantz Jean
(74) *Attorney, Agent, or Firm* — Patterson + Sheridan, LLP

(57) ABSTRACT

Embodiments presented herein enable an enterprise to rapidly define and generate views of cloud based computing resources. In one embodiment, the cloud based service provider hosts a view service as an additional service layer between customer applications and the web service APIs hosted by that service provider. This intermediary service layer allows customers to compose and access API views generated using the web service APIs published by the cloud based computing service. The service provider may expose the view service itself using an API which allows client applications to invoke an API call to generate a given API view from the corresponding API view definition.

21 Claims, 7 Drawing Sheets

API View Definition

Name: VM_Status_by_Scaling_Group

Web service APIs:
Find all VM instances
Find Scaling Group instances and members of each group
Find Monitoring alarms for prior 24 hours per scaling group View Output Format: Database Table
Field 1: VM Instance ID (Required, Primary)
Field 2: Hostname | Null
Field 3: Scaling Group ID | Null
Field 4: Alert ID | Null
Field 5: Alert Date (If Alert ID !Null, required)
Field 6: Alert API View (If Alert ID !Null, required)

API View: VM_Status_by_Scaling_Group

| VM ID | Hostname | Scaling Group | Alert ID | Alert Date | ViewRef |
|---|---|---|---|---|---|
| 003 | IMAP1 | | 92A | 10/10/15 | Link |
| 007 | Web1 | Web-Server | | | |
| 013 | Web2 | Web-Server | EF4 | 10/11/15 | Link |
| 017 | Web3 | Web-Server | 9C3 | 10/10/15 | Link |
| 018 | dbser1 | Database | | | |
| 021 | dbdat1 | Database | | | |
| 023 | | | 92X | 10/10/15 | Link |
| 034 | App3 | App-Server | | | |
| 035 | App4 | App-Server | | | |
| 037 | App5 | App-Server | | | |

STORED VIEWS OF WEB SERVICE APPLICATION PROGRAMMING INTERFACES (APIS)

BACKGROUND

Cloud computing has become a widely adopted approach for an enterprise to obtain access to large amounts of computing resources. One of the primary technologies underlying cloud computing is virtualization. Virtualization allows a physical computing server to host multiple virtual machine instances, each of which executes as an independent computing system with virtual hardware components, such as a CPU and memory, managed by an operating system. Once launched, an enterprise can run applications on a virtual machine instance in the same manner as applications running on a physical computing system or server used by the enterprise. For example, an enterprise may use cloud computing to provide a retail shopping website backed by virtual machine instances running web-servers, application servers, and database applications. Because additional virtual machine instances can be launched on demand, cloud computing allows an enterprise to obtain computing resources as needed without having to invest and maintain an underlying physical computing infrastructure.

In addition to providing virtual machine instances, a cloud computing provider may offer a variety of other virtual computing resources and computing services to clients. For example, the service provider may offer database services, persistent storage, networking services, load balancing, auto-scaling, messaging, cloud formation, monitoring services etc., as part of a cloud based services offering. Customers typically invoke application programming interfaces (APIs) defined by web services published by the provider to access, instantiate, manage, and control a given virtual computing resource or service. For example, an enterprise customer may invoke API calls exposed by the service provider to launch, configure, access, and manage cloud based computing resources as needed, e.g., by composing applications which invoke API calls or using a service console or command line tool which invokes such API calls. Often, for reasons of scalability, each service offered by the cloud provider is accessed using an independent API (or distinct console application) that exposes a basic set of functions associated with the corresponding service.

An enterprise can then build more complex operations using the basic set of services exposed by the APIs. However, in order for an enterprise to obtain higher-level logical views of their cloud based computing resources, they need to program logic in their applications directly. Doing so typically requires the enterprise to develop applications which invoke multiple APIs of different services, filter result sets on the client side, and merge the data together in the form the customer wants.

BRIEF DESCRIPTION OF DRAWINGS

Various embodiments in accordance with the present disclosure will be described with reference to the drawings, in which:

FIG. 4A illustrates an example of an API view definition used to construct a view of virtual machine instances and other cloud based computing resources, according to one embodiment.

FIG. 4B illustrates an example of a API view generated from the API view definition shown in FIG. 4A, according to one embodiment.

DETAILED DESCRIPTION

Figure 1:
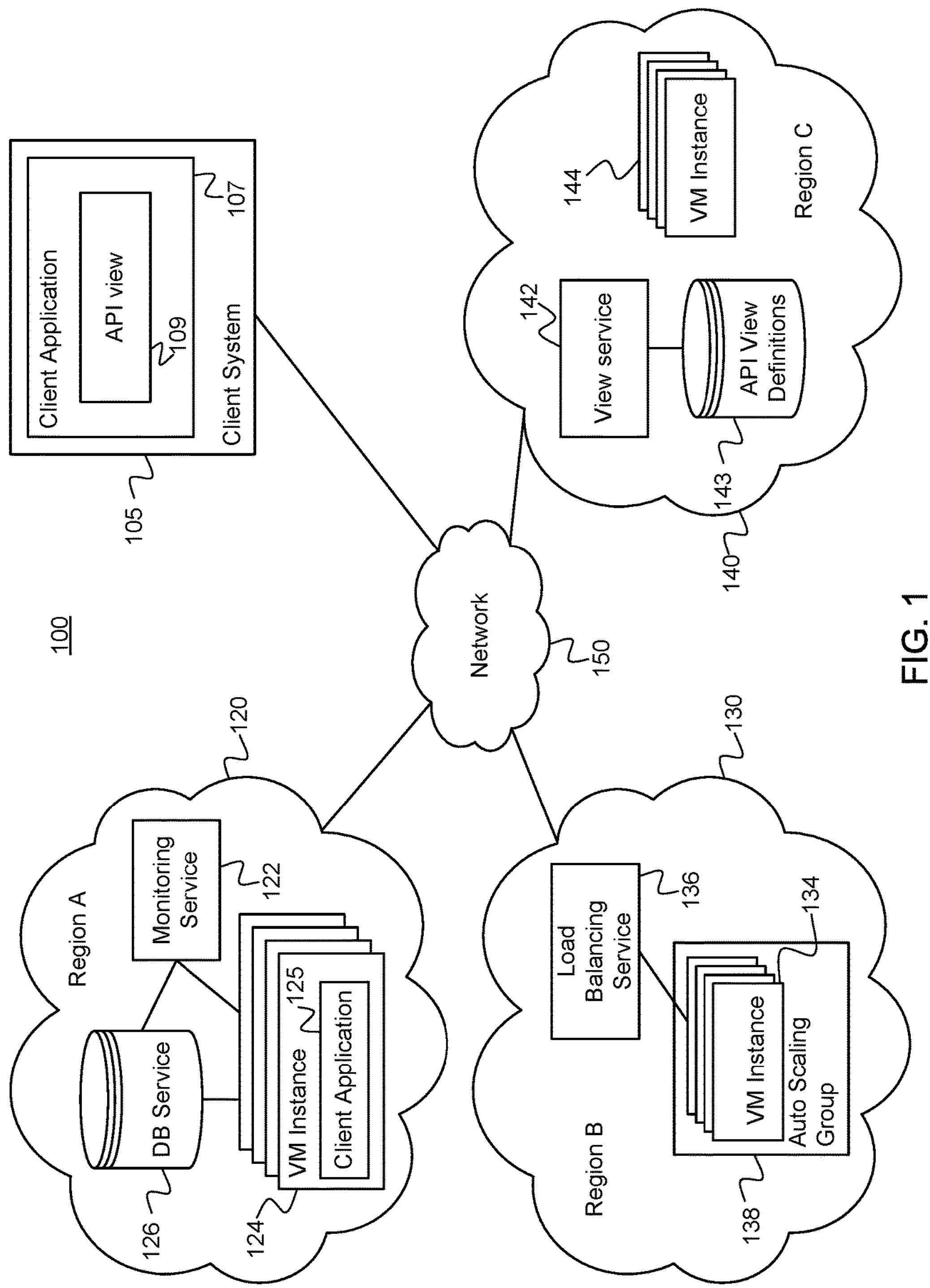
FIG. 1 illustrates an example of a cloud based computing environment hosting computing resources for a given enterprise, according to one embodiment.

The variety of services offered by cloud based computing service providers continues to grow, and as enterprises move applications and services to "the cloud," it becomes challenging for large enterprise customers to manage a fleet of computing resources. For example, while service providers often provide a service console or management tool for cloud based computing resources, such tools, and the underlying APIs, are typically configured to manage each distinct computing resource type individually. That is, to inspect or identify a fleet of computing resources belonging to a given account (e.g., virtual machine instances, data storage and networking services, database services, message queueing services, load balancing services, auto-scaling services, etc.), an enterprise customer has to use the underlying management console (or API) for each computing resource individually. Thus, enterprise customers which manage large fleets of cloud based computing resources often have to compose custom search tools or applications that invoke APIs for each service individually just to understand what resources have been deployed or are active at any given time. Such applications typically have to join information from different APIs in order to present information to a customer. The result is that customers develop custom application logic for each desired view of API data. This approach does not scale as new services are added by the cloud based service provider and as the information enterprise customers want to include in a view of API Data changes over time.

Embodiments presented herein enable an enterprise to rapidly define and generate views of cloud based computing resources, where the resources are accessed using a set of web service APIs exposed by the service provider. In one embodiment, the cloud based service provider hosts a view service as an additional service layer between customer applications and the web service APIs hosted by that service provider. This intermediary service layer allows customers to compose their own API views. For example, a customer could create a view which lists active virtual machine instances running in the provider's computing cloud along with an indication of what auto scaling group (if any) a given virtual machine is attached to and any alerts related to any of the virtual machine instances published by a monitoring service. Once an API view is defined, customer applications may query this API view, rather than each application having to include the logic to call multiple downstream APIs relating to virtual machines, auto scaling groups, and monitoring alerts, and then join the data from the APIs of each web service. Thus, API views simplify customer applications, as the common querying functions needed to generate a view are encapsulated into the intermediary layer hosted by the service provider. In addition, the service provider could publish a management console (or web-based application) used to build an API view definition or request an API view based on a given API view definition.

In one embodiment, the customer creates a view by specifying (in a view definition) what web services should be queried to retrieve data about the cloud based computing resources deployed by that customer. In addition, the customer specifies what information returned by the web service APIs should be included in the API view and how this information should be correlated to produce the API view. For example, the view definition may specify how to filter response data, what fields to include in a view, and what data from the web service APIs to use to populate each field. A view definition may also specify how to format a response object generated by from an API view definition. For example, the API view could specify that a view should be generated as a database table, a JSON object, an XML, document, a programmatic object, or unstructured text.

In one embodiment, the service provider may publish a compositional tool used to build an API view. Such a tool could include a canvas allowing customers to specify which web services or computing resources should be interrogated to build a given API view, how data from these web services should be joined together in the API view, and the presentation and formatting properties of a response object. An API view definition could also specify any processing logic used to generate data to include in the API view based on the data returned by the web service APIs. For example, the view definition could include processing logic executed to translate virtual machine instance IDs into meaningful names. Or, returning to the example of a retail web service, the view definition could include the relative percentage of virtual machine instances used to host a web server, application server, and database or changes in the instance count of such virtual machine instances over a specified time period. Further, the API view definition could also invoke web services external to the provider computing cloud or access data sources controlled by the customer in building a given API view definition.

Once defined, an API view definition may be stored by the service provider and used to generate a view as requested by the owning customer. To access an API view, the customer may need only to invoke an API call exposed by the view service layer (or invoke the API view using an management console). That is, like the underlying web services used to manage a fleet of computing resources, the API view service may itself be accessed by customers using a corresponding API. For example, the view service API may include a function call passed the name of the API view definition and any credentials or parameters needed to access or generate the API view. In response, the view service retrieves the API view definition, invokes the web service API calls specified therein, and builds the view response object according to the API View definition.

As the API view definition is stored with the service provider, any customer application can access the view without needing to include the underlying logic needed to build the view, resulting in greater reusability for API views. Further, in some cases, an enterprise could publish an API view and allow third parties to access the view. For example, assume an enterprise deploys a web service on virtual machine instances of a cloud service provider, which other third party applications access (e.g., a web service which provides an analysis of financial instruments). In such a case, the enterprise could publish an API view which presents health or latency information about the financial analysis service exposed by the enterprise and hosted by the cloud based service provider.

Further, views may be hierarchical. That is, a component of an API view definition may itself be another API view. For example, assume an API view returns a database table populated with virtual machine instance IDs, any group membership for the instances, and any recent alerts generated by a monitoring service. In such a case, the field of the database table presenting an alert associated with one of the virtual machine instances could itself reference an API view which retrieves a collection of data relevant to a given alert from different web services. The customer could step between different tabular views of data generated from API view definitions by the view service layer, as needed. Further, API views could be composed to present a set of desired metrics about a collection of cloud computing resources, e.g., recent virtual CPU utilization for a group of virtual machine hosting a client application which could be correlated by a client application with other performance metrics (e.g., response latency for a website hosted by web server applications running on the virtual machine instances).

Advantageously, the API view service described herein allows customers of a cloud computing service provider to compose and access API views generated using the web service APIs published by the cloud based computing service. As noted, the service provider may expose the view service as an intermediary layer between customer applications and the web service APIs hosted by that service provider. The service provider may expose the view service itself using an API which allows client applications to invoke an API call to generate a given API view from the corresponding API view definition.

FIG. 1 illustrates an example of a cloud based computing environment hosting computing resources for a given enterprise, according to one embodiment. As shown, the computing environment 100 includes a client computing system 105 and three cloud computing regions—region A 120, region B 130, and, region C 140. Each region 120, 130, and 140 generally corresponds to a region defined by a service provider in offering cloud based computing services to customers. Accordingly, customers may provision, launch, and manage virtualized computing resources within the computing clouds of regions 120, 130, and 140. The deployment and management of the computing resources in each region is generally isolated from others. While cloud computing regions 120, 130, and 140 may be drawn along any arbitrary boundary, cloud computing regions often correspond to geographic or national boundaries.

For the example of FIG. 1, assume the same enterprise customer has deployed a set of computing resources in region 120, 130, and 140 as well as defined relationships, group memberships, identity and access permissions, tags, and metadata describing some the computing resources. Illustratively, region A 120 includes a group of virtual machine (VM) instances 124 which host a client application 125 and access an instance of a database service 126. For example, VM instances 124 could access product data and website content related to products offered for sale at a website run by the enterprise customer and stored by the database service 126. In addition, a monitoring service 122 may be service provided by the cloud based provider that collects and tracks performance metric data related to the instance of the DB service 126 and VM instances 125 deployed by the enterprise in region 120.

Region B 130 includes a group of virtual machine (VM) instances 134 which process requests distributed by a load balancing service 136. In this example, the count of the VM instances 134 scales on demand using an auto-scaling group 138 defined by the enterprise customer. Continuing with the example of an online retailer, VM instances 134 could each host a web server configured to serve a retail website, allowing customers to view, select, and purchase goods. At times of high demand, e.g., during the holiday season, the auto-scaling group 138 launches additional VM instances 134 using criteria specified by the enterprise customer. Region C 140 includes a group of VM instances 144. Continuing with the example of an online retailer, VM instances 144 could run applications for transaction processing, inventory management, fulfillment, and accounting for the online retailer.

Client system 105 provides a computing system used to access and manage the virtualized computing resources deployed by the enterprise customer in the computing clouds of regions 120, 130, and 140 (e.g., the VM instances, auto-scaling groups, load balancing service, network, and database services, etc.). Client system 105 is included to be representative of a general purpose computing system such as desktop computer and laptop computer systems, as well as representative of mobile computing devices such as tablets and smart phones configured with service console applications or web browser software.

As shown, the client system 105 includes a client application 107, which itself includes an API view 109. In one embodiment, the client application 107 invokes an API exposed by a view service 142 in order to obtain the API view 109. The API view 109 is generated according to an API view definition of a plurality of API view definitions 143. The view service 142 may generate the API view 109 by invoking APIs of the web services offered by the cloud based provider and building a response object, according to the corresponding API view definition 143.

As shown, region C 140 includes the view service 142 and API view definitions 143. In one embodiment, the view service 142 provides an intermediary web service layer exposed by the service provider of cloud computing regions 120, 130, and 140. As described herein, the view service 142 is configured to invoke web service APIs otherwise used by the enterprise customer to access, manage, and control the VM instances 124, 134, 144, auto scaling group 138, load balancing service 136, database service 126, and monitoring service 122 (as well as other could computing services) deployed by the enterprise customer in the cloud computing regions 120, 130, and 140. The API view service 142 may do so in order to generate API views 109 of the computing resources based on a given API view definition 134. In one embodiment, a view definition 143 may describe a collection of cloud based computing resources to query using the web service APIs, as well as describe how to compose a response object using the results obtained by querying the web service APIs.

For example, for an API view 109 presented as a database table, a corresponding API view definition 143 could specify what fields to include in the database table and what data from the web service APIs to use to populate each field in the table. Further, the API view definition 143 could specify how to join information from different web service APIs in building the database table, e.g., how to correlate information about auto scaling group 134 with specific VM instances identified in the database table. The API view definition 143 could also specify any processing logic, conditions, or filters to apply to the data retrieved using the web service APIs in building API view 109. For example, a view definition 143 could filter what VM instances are identified in the database table to instances having a particular attribute (e.g. as being a member of auto scaling group 134 or as being within a specific one of the cloud computing regions 120, 130, or 140). Of course, for other response formats, e.g., a JSON or XML document or a serialized object, the view definition 143 would specify how to build a response object, i.e., an API view 109, from the web service API data, according the response object format specified by the view definition 143.

Figure 2:
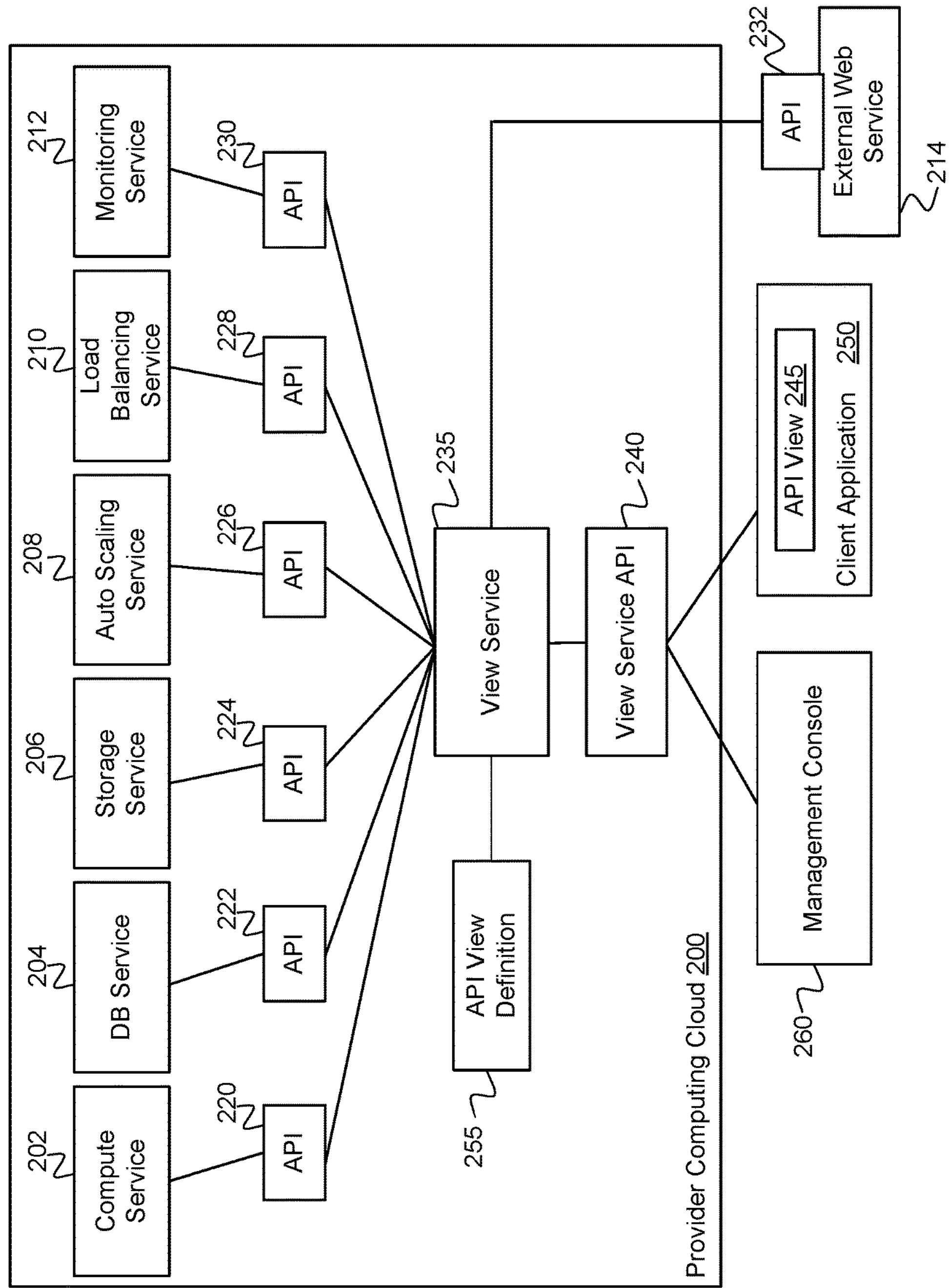
FIG. 2 illustrates a view service and view service API disposed between customer applications and a collection of web service APIs, according to one embodiment.

FIG. 2 illustrates a provider computing cloud 200 hosting a view service 235 and view service API 235 disposed between customer application 250 and a collection of web service APIs 220-230, according to one embodiment. As shown, the provider computing cloud 200 includes a collection of cloud computing services 202-212, each accessed by client applications via one of the APIs 220-230. In this example, the services include a compute service 202, database service 204, storage service 206, scaling service 208, load balancing service 210, and a monitoring service 212, accessed by APIs 220, 222, 224, 226, 228, and 330, respectively.

The compute service 202 generally allows customers to configure and launch virtual machine instances in the computing cloud 200. For example, API 220 may include calls used to specify a virtual machine image with attributes for a virtual processor, memory, and operating system to launch as a VM instance within the computing cloud. In addition, the compute service 202 could allow customers to specify and report on network connectivity among groups of VM instances, e.g., by assigning network addresses to each VM instance. Database service 204 may provide an instance of a database store (e.g., a key value or a relational store) used to store customer data, read and written using calls provided by API 222. Storage service 206 may allow users to provision persistent data storage volumes for VM instances using API 224. For example, the customer may provision a virtual block storage device which a VM instance can mount and unmount using calls provided by API 224.

The auto scaling service 208 may provide a service which monitors the processing (or other activity) of a group of computing resources (e.g., VM instances). The auto scaling service 208 can add (or remove) computing resources from the group (e.g. by launching or tearing down a VM instance) when the processing activity exceeds thresholds defined for a given auto scaling group. API 226 may be used to define an auto scaling group along with the thresholds used to scale the resources assigned to that group, as well as report on instances launched or removed from the auto scaling group by the scaling service 208. The load balancing service 210 may allow a customer to define a load balancing object which receives and distributes requests (e.g., HTTP requests for a web page) across a group of servers specified using calls to the API 228. Monitoring service 212 may be used to define alerts based on watches of activity, resource utilization, or events. Calls to API 230 may be used to specify conditions for a given alert, the resources to which the alert is associated, a state of the alert (e.g., as being active or inactive), and what action to perform (e.g., what system or person to message) when alert conditions are satisfied.

Of course, one of ordinary skill in the art will recognize that the collection of cloud computing services 202-212 shown in FIG. 2 is included to be generally representative of an offering of a cloud computing service provider. The actual services offered by such a provider may include any of these and a variety of other services (e.g., cloud formation services, hybrid cloud services, search services message queues, virtual data center services, software defined networking services, etc.)

As shown, FIG. 2 also illustrates a view service 235 and view service API 240. In one embodiment, like the services 202-212, view service 235 comprises a service hosted by the provider of computing cloud 200. That is, the view service 235 and services 202-212 are deployed to a common cloud computing environment. In one embodiment, the view service 235 is generally configured to generate an API view 245 for a client application 250 by querying one or more of the compute services 202-212, via the corresponding APIs 220-230. The view service 235 could also query an external web service 214 via API 232 in order to retrieve data outside of the provider computing cloud 200 to use in composing API view 245. That is, the web service 235 is included to represent a web service not hosted within the provider computing cloud 200. For example, the view service 235 could invoke a web service exposed by the customer or a third party web service. In either case, the API view definition 255 would specify the network endpoints and parameters needed to invoke API 232 to access external web service 214. Which web service APIs 220-232 are accessed, what data about a customer's cloud computing resources is retrieved via the APIs 220-232, and what information is retrieved for a given API view 245 may be stored in API view definition 255. In one embodiment, client application 250 accesses the view service 235 via view service API 240. That is, the view service API 235 may expose web service calls which client application 250 may invoke to cause the view service to generate and return the API view 245. Management console 260 provides an application which may also be used to comprise an API view definition 255 as well as request an API view be generated based on the API view definition 255.

The view service API 240 may also include calls used to compose, create, upload, edit, and modify a given view definition, specify permissions for accessing a given API view definition 255. In doing so, the view service 235 and view service API simplify customer applications, as the common querying functions needed to build a view is stored in the view service 235 and different client applications may use the view API service to generate the same API View 245 using a given API view definition 255.

Figure 3:
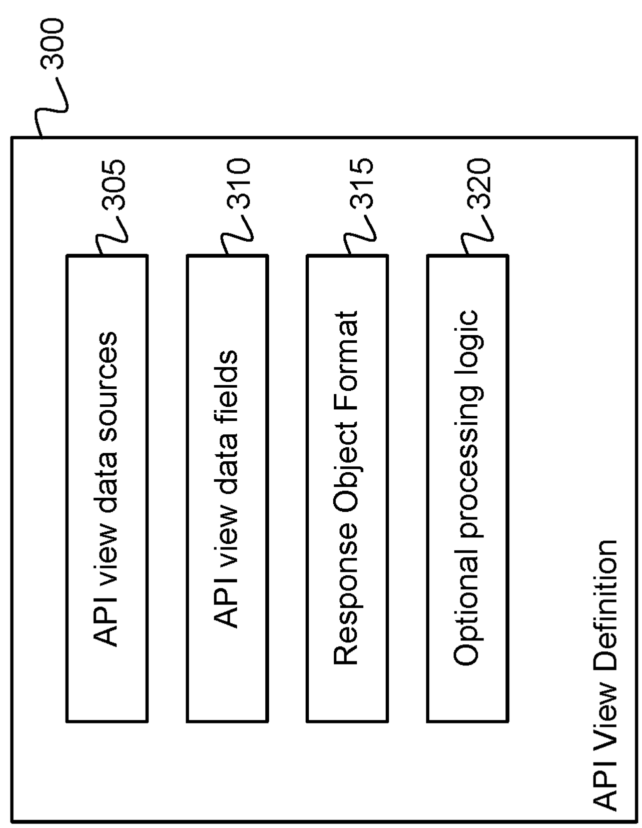
FIG. 3 illustrates an example of an API view definition, according to one embodiment.

FIG. 3 illustrates an example of an API view definition 300, according to one embodiment. As discussed above, an API view definition 300 may specify a set input data sources, an arrangement of data fields for an API view, and a response object format for the API view created from a given API view definition. Illustratively, API view definition 300 includes API view data sources 305, API view data fields 310, response object format 315, and optional processing logic 320.

In one embodiment, the API view data sources 305 identify a set of cloud based computing resources to query, e.g., via a set of web service APIs, to retrieve data needed to compose an API view. API view data fields 310 may specify what data elements retrieved using the web service API's to include in an API view. Further, the API view data fields 310 may specify declarative rules indicating how the view service should join data from different web service APIs in building an API view. For example, the API view data fields 310 may specify common data fields (e.g., a VM instance ID) used to correlate other data elements (e.g., alert IDs or auto scaling group membership IDs) returned by various web service APIs queried by the view service according to the API view data sources 305.

Response object format 315 may specify a container or object type to use in packaging an API view returned to a client. For example, an API view may be defined as a relational database table, an XML or JSON document, a programmatic object (e.g., a serialized java object), comma separated text values, etc., to return as a response object. Optional processing logic 320 includes any data processing, filtering, mapping, or computing that should be performed by the view service prior to returning an API view to a client application. For example, processing logic 320 could be executed using data elements returned by the input data sources to generate performance metrics or other useful information about the underlying cloud computing resources.

FIG. 4A illustrates an example of an API view definition 400 used to construct an API view of virtual machine instances and other cloud based computing resources, according to one embodiment. As shown, the API view definition 400 includes a name used to identify definition 400. In this example, a name of "VM_Status_by_Scaling_Group" has been assigned to definition 400. In one embodiment, the name may be a parameter passed to a call of view service API (e.g., API 240 of FIG. 2) in order to cause the view service to generate the API view corresponding to the named API view definition. API view definition 400 also shows what web service APIs to invoke to obtain data as needed to generate an API view corresponding to view definition 400. In this example, the API view definition 400 invokes API calls to identify a set of active VM instances, active scaling groups, and any monitoring alarms associated with these cloud based computing resources which have occurred in the last 24 hours.

API view definition 400 also shows an output format of the API view definition as being a database table. The view definition 400 also specifies which fields should be included in the database table, as well as relationships among the fields of the database table. In this case, API view definition 400 includes a VM Instance as a required element for each database record, which also serves as a primary key for records of the database table. The database table returned as the API view for definition 400 also includes a hostname field, a scaling group ID field, and an alert ID field. The database table also includes an alert date field and an alert API view field, which, if the alert ID is not null in a given record, are required fields for that database record. In this example, the alert API view represents an API view definition nested within API view definition 400.

FIG. 4B illustrates an example of an API view generated from the API view definition 400 shown in FIG. 4A, according to one embodiment. As shown, database table 450 has been generated according to the API view definition 400. Accordingly, the database table 450 includes columns for a VM instance ID, a hostname, a scaling group ID, an alert IDs, an alert date, and for an alert view reference, as specified in view definition 400. As shown, the database table 450 includes records for ten VM instances each of which has a VM instance ID (as the required field and primary key of table 450). At the same time, some of the ten database records have hostnames and are identified as being members of a "web-server," "database," or "app-server" scaling group. In addition, where alerts have occurred in the last 24 hours (as specified by view definition 40), the corresponding records in database table 450 include alert information. For example, two of the VM instances in the "web-server" scaling group show data related to an alert generated by the monitoring service.

Illustratively, the "View Ref" column includes a "Link." This column is included in FIG. 4B to represent a nested API view within the database table 450. In this example the "link" value may provide a reference to another API view available from the view service, e.g., a view which obtains additional data by invoking the APIs of the underlying monitoring service, scaling group service, or other web service APIs related to the corresponding alert in the records of database table 450.

Figure 5:
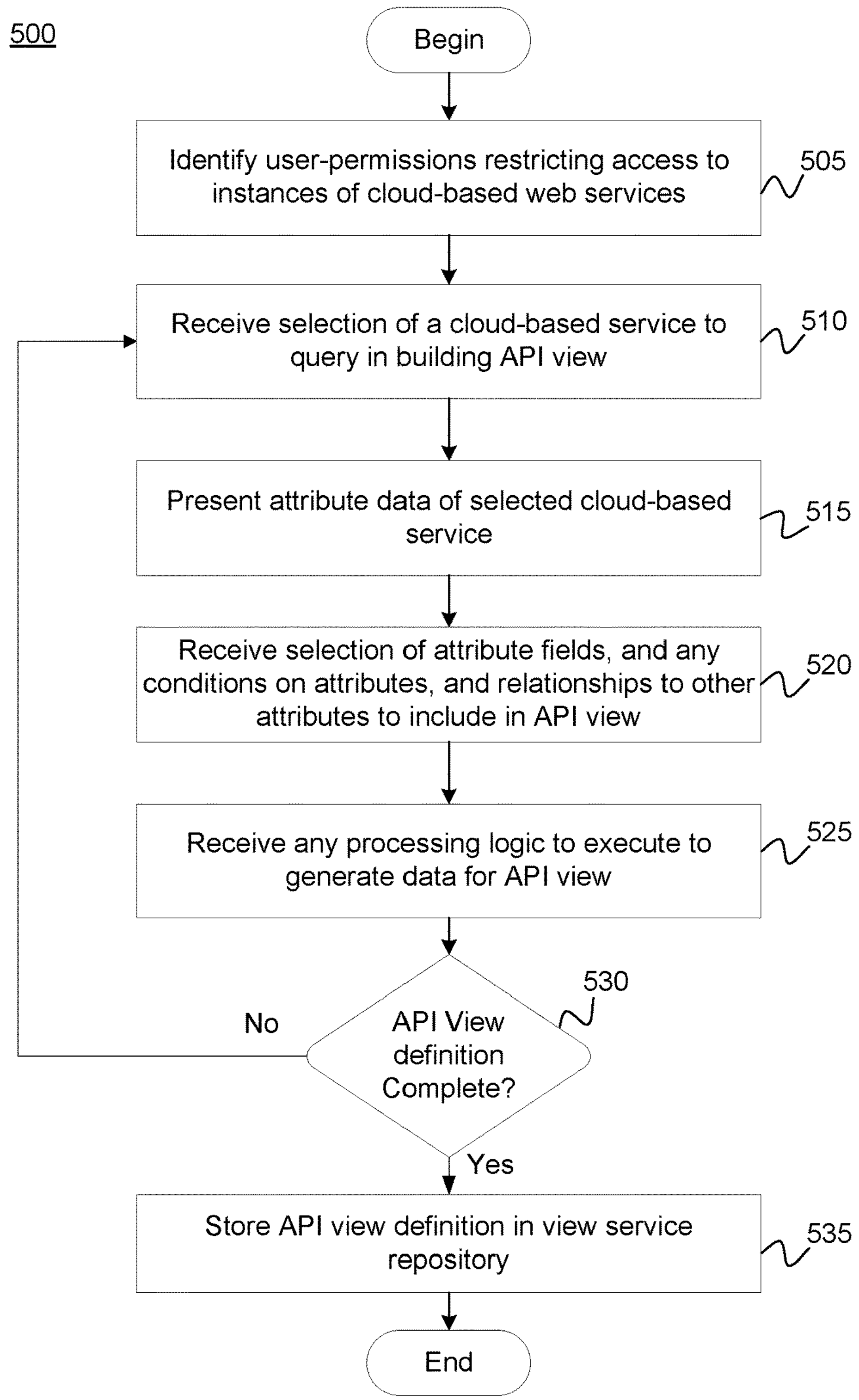
FIG. 5 illustrates a method for composing an API view definition, according to one embodiment.

FIG. 5 illustrates a method 500 for composing an API view definition, according to one embodiment. As shown, the method 500 begins at step 505 where a view service, or other view composing tool, identifies the access control permissions a given user has to access the web service APIs used to provide cloud computing resources (e.g., VM instances, scaling groups, storage and database services, etc.). That is, the view service identifies what input data sources a given user may access data from and, therefore, include in API view definition. At step 510, the view service receives a selection of a cloud based service to access in building an API view. Alternatively, the view service could receive a selection of an external web service (and needed service endpoints and parameters) accessed to retrieve data outside of the provider computing cloud. And at step 515, the view service presents an indication of the available attribute values that are associated with the selected cloud based service. For example, assume a user composing an API view definition selects an auto scaling group service. In such a case, the view service would respond by presenting attributes related to scaling groups, e.g., the ID of each VM instance in a scaling group, a group name, attributes related to scaling incidents such as adding or removing computing resources from a scaling group, along with thresholds for doing so. Similarly, for a storage service, the view service could include attributes indicating an instance ID of a VM instance a virtual block device is attached to (if any) or, for a compute service, the view service could present a collection of attributes available which related to each VM instance launched by a given customer. Of course, the attributes for these, and other, cloud computing resources which can be included in an API view definition may vary based on the needs of a particular case.

After retrieving and presenting the attributes associated with a given computing resource (steps 510 and 515), the view service receives a selection of the attribute fields to include in the API view definition being composed (step 520). In addition, the user composing a view may specify any conditions or filters to apply to the raw data retrieved from one web service API as well as relationships used to join data from one web service API with data from another web service API. At step 530, the view service receives any processing logic to execute when composing an API view. For example, a customer could specify processing logic which converts raw data from one of the provider web services into a format for presentation in an API view. At step 530, once complete, an API view definition may be stored by the view service. Otherwise, the method returns to step 510 where another computing resource (and web service API) is selected to continue composing the API view definition.

Figure 6:
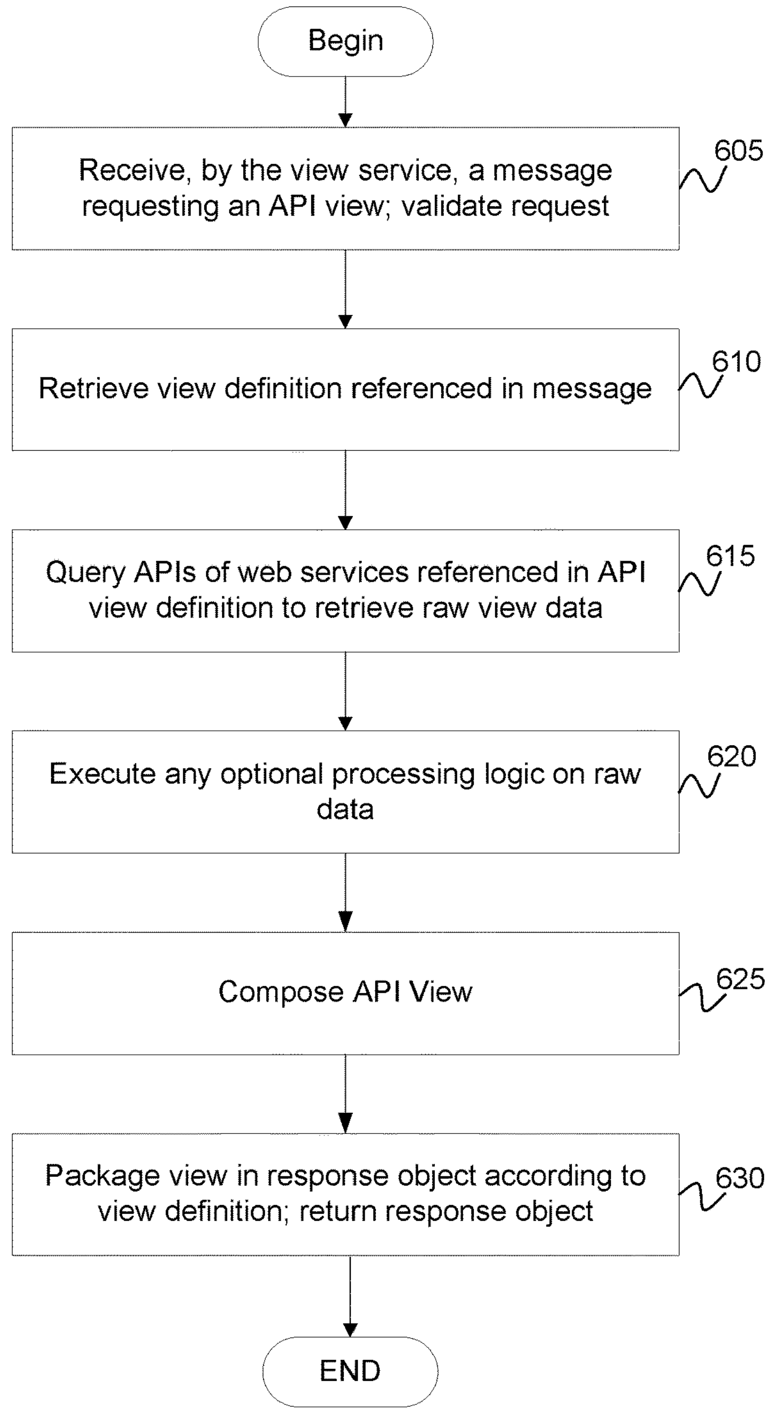
FIG. 6 illustrates a method for the view service of shown in FIG. 2 to build an API view, according to one embodiment.

FIG. 6 illustrates a method 600 for the view service of shown in FIG. 2 to build an API view, according to one embodiment. As shown, the method 600 begins at step 605 where a view service in a cloud based computing platform receives a message requesting an API view. As noted, e.g., the view service may be accessed using a view service API call which is passed the name of an API view definition. Once the request is validated, e.g., after authenticating any credentials supplied by the client application and confirming the user has the appropriate access control privileges, call, the view service retrieves the API view definition identified in the request (step 610).

At step 615, the view service queries the native APIs of each web service referenced in the API view definition retrieved at step 610. For example, the view service could query a compute service to retrieve information regarding each VM instance deployed by a customer, an auto scaling service to determine which VM instances are members of an auto scaling group, and a monitoring service to identify alerts generated during a specified time period—as in the example of FIGS. 4A and 4B. Of course, the specific web service APIs invoked by the view service will depend on the particular API view service definition.

At step 620, the view service executes any processing logic specified in the API view definition retrieved at step 610. As noted above, such processing logic cold be used to generate performance metrics or other useful information about the underlying cloud computing resources using the data retrieved in step 615. After querying the appropriate web service APIs, the view service generates an API view using the raw data returned by the web service APIs (step 625). And at step 630, the view service packages the API view as a response object, as specified by the API view service definition. As noted, e.g., the response object could be formatted JSON object, an XML document, a programmatic object, or unstructured text. At step 630, the view service returns the API view generated at steps 610-620.

Figure 7:
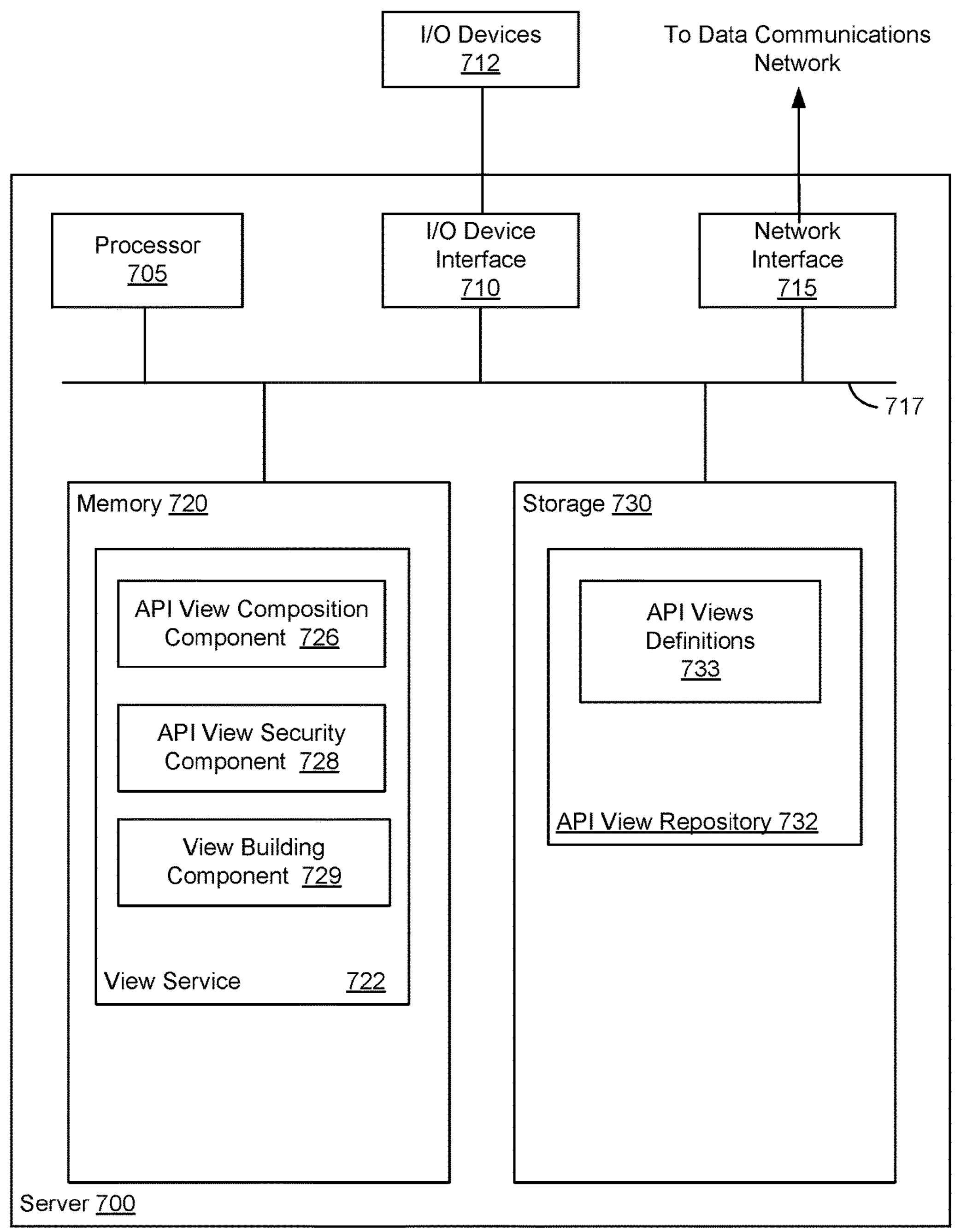
FIG. 7 illustrates an example computing system used to host components of the view service first illustrated in FIG. 2, according to one embodiment.

FIG. 7 illustrates an example computing system used to host components of the view service first illustrated in FIG. 2, according to one embodiment. As shown, the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, display and mouse devices) to the computing system 700. In context of this disclosure, the computing elements shown in computing system 700 may correspond to a physical computing system (e.g., a system in a data center) or may be a virtual computing instance executing within a computing cloud. Further, while shown as running on a single computing server 700, components in memory 720 and storage 730 may be deployed across multiple computing servers.

The CPU 705 retrieves programming instructions and application data stored in the memory 720 and storage 730. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an API view service 722, which itself includes an API view composition component 726, an API view security component, and an API view building component 729, and the storage 730 includes an API view repository 732 and API view definitions 733. As described, the API view service 722 may be generally configured to allow users to create, edit, update, and delete API view definitions 733 maintained in the API view repository 723. Further, the API view service 722 may generate API views from a given API view definition 733 stored in the API view repository 732. To do so, users may create an API view definition 733 using the composition component 726. For example, the API composition component 726 could provide a canvas used to create graphical representation of a view defined using icons to represent each web service to query to generate a view. Alternatively, the API composition component 726 could be accessed using a view service API which allows users to specify what cloud based resources to include in a given API view definition 733 stored in the API view repository 732.

In one embodiment, the view API view security component 728 may be configured to limit what web service APIs, or what attributes of cloud based resources, a given user may include in a given API view definition 733. That is, the API view security component 728 may generally prevent users from gaining unauthorized access to the attributes, configuration, or other information about cloud computing resources by composing an API view definition and using that definition to obtain an API view which contains information that the user is not authorized to access. Similarly, the API view security component 728 may prevent a given user from generating an API view using an API view definition 733 for which that user does not have the appropriate access privileges. API view building component 729 may generally be configured to generate an API view from an API view definition, e.g., according to the method 600 of FIG. 6.

Advantageously, embodiments discussed above enable an enterprise to rapidly define and generate views of cloud based computing resources. In one embodiment, the cloud based service provider hosts a view service as an additional service layer between customer applications and the web service APIs hosted by that service provider. This intermediary service layer allows customers to compose and access API views generated using the web service APIs published by the cloud based computing service. The service provider may expose the view service itself using an API which allows client applications to invoke an API call to generate a given API view from the corresponding API view definition.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing instructions executable to perform an operation comprising:

receiving, by a view service, an application programming interface (API) view definition, wherein the API view definition specifies: (i) one or more web services accessed to retrieve data describing cloud computing resources, (ii) a set of one or more data fields to populate using data retrieved from one or more of the web services, and (iii) a format for a response object to package the view of the cloud computing resources;

storing the API view definition in a repository accessible to the view service; and upon receiving, by the view service, a request for the view of the cloud computing resources corresponding to the API view definition:

accessing each of the one or more web services referenced in the API view definition to retrieve the data describing the cloud computing resources;

composing a view of the cloud computing resources according to the API view definition and by operation of one or more computer processors when executing the instructions, by populating the one or more data fields specified in the API view definition based on at least the retrieved data;

generating a response object containing the composed view, wherein the response object is formatted according to the format specified in the API view definition; and returning, in response to the request, the response object.

2. The non-transitory computer-readable medium of claim 1, wherein each web service is accessed by invoking one or more API calls.

3. The non-transitory computer-readable medium of claim 1, wherein the request for the view of the cloud computing resources corresponding to the API view definition comprises an invocation of an API call to an API which exposes the view service.

4. The non-transitory computer-readable medium of claim 1, wherein the format for the response object comprises one of a database table, a JSON document, an XML document, a programmatic object, and unstructured text.

5. The non-transitory computer-readable medium of claim 1, wherein the API view definition further specifies how to correlate the data retrieved from one or more of the web services in populating the set of one or more data fields.

6. The non-transitory computer-readable medium of claim 1, wherein the cloud computing resources include one or more of instances of virtual machines (VM), data storage resources, database services, message notification services, message queueing services, load balancing services, resource monitoring services, and auto-scaling group services.

7. A system, comprising:

one or more computer processors; and a memory containing a view service accessible within a cloud computing platform, wherein the view service, when executed on the one or more computer processors, performs an operation to process a request for an application programming interface (API) view, the operation comprising:

retrieving an API view definition identified in the request for the API view, wherein the API view definition specifies: (i) one or more web services accessed to retrieve data used to populate one or more data fields defined by the API view definition and (ii) a format for a response object to package the API view;

invoking one or more APIs corresponding to each of the one or more web services;

generating the requested API view based on at least the API view definition and a set of response data retrieved from the invocation of the one or more APIs; and generating a response object containing the generated API view and formatted according to the format specified in the API view definition.

8. The system of claim 7, wherein the operation further comprises:

a repository hosted in the cloud computing platform, wherein the repository stores a plurality of API view definitions.

9. The system of claim 7, wherein the API view definition further specifies how to correlate the data retrieved from one or more of the web services in populating the set of one or more data fields.

10. The system of claim 7, wherein the operation further comprises:

returning, in response to the request for the API view, the response object containing the generated API view.

11. The system of claim 10, wherein the format comprises one of a database table, a JSON document, an XML document, a programmatic object, and unstructured text.

12. The system of claim 7, wherein the operation further comprises, determining access privileges assigned to a requesting client submitting the request for the API view.

13. The system of claim 7, wherein the cloud computing resources include one or more of instances of virtual machines (VM), data storage resources, database services, message notification services, message queueing services, load balancing services, resource monitoring services, and auto-scaling group services.

14. The system of claim 7, wherein the API view definition further specifies processing logic used to generate data to include in the requested API view based on at least the response data retrieved from the invocation of the one or more APIs.

15. The system of claim 7, wherein at least a first one of the web services is an external web service hosted outside of the cloud computing platform.

16. A computer-implemented method for generating an application programming interface (API) view definition for an API view of cloud computing resources, the computer-implemented method comprising:

receiving, by a view service hosted within a cloud computing platform, an indication of at least a first web service to query to obtain raw data associated with the cloud computing resources, wherein the raw data is used to generate the API view of the cloud computing resources;

receiving a selection of a plurality of data fields to populate in the API view using the raw data obtained by querying at least the first web service;

receiving a format for a response object to package the API view of the cloud computing resources; and storing, as the API view definition and by operation of one or more computer processors, at least the indication of the first web service, the selection of the plurality of data fields, and the format for a response object, wherein the API view definition is stored in a repository accessible to the view service.

17. The computer-implemented method of claim 16, further comprising:

upon receiving, by the view service, a request for the API view of the cloud computing resources corresponding to the API view definition:

querying at least the first web service referenced in the API view definition to retrieve the raw data;

generating the API view of the cloud computing resources according to the API view definition, by populating the plurality of data fields of the API view based on at least the raw data;

generating the response object containing the generated API view according to the format specified in the API view definition; and returning, in response to the request, the response object.

18. The computer-implemented method of claim 17, wherein the request for the API view corresponding to the API view definition comprises an invocation of an API call to an API which exposes the view service on the cloud computing platform.

19. The computer-implemented method of claim 16, wherein the first web service is queried by invoking one or more API calls.

20. The computer-implemented method of claim 16, wherein the format for the response object comprises one of a database table, a JSON document, an XML document, a programmatic object, and unstructured text.

21. The computer-implemented method of claim 16, wherein the cloud computing resources include one or more of instances of virtual machines (VM), data storage resources, database services, message notification services, message queueing services, load balancing services, resource monitoring services, and auto-scaling group services.

* * * * *